United States Patent [19]

Kitajima et al.

[11] Patent Number: 5,193,154
[45] Date of Patent: Mar. 9, 1993

[54] BUFFERED PERIPHERAL SYSTEM AND METHOD FOR BACKING UP AND RETRIEVING DATA TO AND FROM BACKUP MEMORY DEVICE

[75] Inventors: Hiroyuki Kitajima; Akira Yamamoto, both of Yokohama; Takashi Doi, Hadano; Masafumi Nozawa, Odawara, all of Japan

[73] Assignee: Hitachi, Ltd., Tokyo, Japan

[21] Appl. No.: 783,718

[22] Filed: Oct. 25, 1991

Related U.S. Application Data

[63] Continuation of Ser. No. 216,604, Jul. 8, 1988, abandoned.

[30] Foreign Application Priority Data

Jul. 10, 1987 [JP] Japan .................. 62-170946

[51] Int. Cl.⁵ .................. G06F 13/00; G06F 11/00; G11C 7/00
[52] U.S. Cl. .................. 395/250; 364/239; 364/239.7; 364/243; 364/268.3; 364/DIG. 1; 371/10.7
[58] Field of Search .............. 395/250, 425, 275, 800; 371/40.1, 40.2, 10.1; 365/189.05; 364/200 MS File, 900 MS File

[56] References Cited

U.S. PATENT DOCUMENTS

| | | | |
|---|---|---|---|
| 3,863,228 | 1/1975 | Taylor | 364/200 |
| 4,051,461 | 9/1977 | Hashimoto et al. | 364/200 |
| 4,124,891 | 11/1978 | Weller, III et al. | 364/200 |
| 4,138,732 | 2/1979 | Suzuki et al. | 364/900 |
| 4,205,374 | 5/1980 | Bardsley, III et al. | 364/200 |
| 4,423,480 | 12/1983 | Bauer et al. | 364/200 |
| 4,428,064 | 1/1984 | Hempy et al. | 364/900 |
| 4,435,762 | 3/1984 | Milligan et al. | 364/200 |
| 4,521,871 | 6/1985 | Galdun et al. | 364/900 |
| 4,654,819 | 3/1987 | Stiffler et al. | 364/200 |
| 4,819,203 | 4/1989 | Shiroyanagi et al. | 364/900 |
| 5,077,656 | 12/1991 | Waldron et al. | 395/325 |

OTHER PUBLICATIONS

IBM Technical Disclosure Buffer, System, Feb. 1960, vol. 2, No. 5.
Bounds, P., "Buffing High Speed Data for MiniComputer Input", Computer Design, 7/73, pp. 69-73.

Primary Examiner—Michael R. Fleming
Assistant Examiner—Gopal C. Ray
Attorney, Agent, or Firm—Pennie & Edmonds

[57] ABSTRACT

A buffered peripheral system comprises a backup memory and a primary control unit which has a buffer memory for temporarily storing a copy of the contents of a buffer memory which stores data to be written to a peripheral device and a control device for issuing a command necessary to write the block stored in the buffer memory device to the peripheral device. The primary control unit also includes a recording device for recording the block number corresponding to the block which was most recently written to the peripheral device. The blocks of data which have been written to the peripheral device is then deleted from the backup memory to make room for storing further blocks of data. The system further has a backup control unit substantially identical to the primary control unit. Only the primary control unit normally operates to control the writing to the peripheral device. Upon detection of the failure of the buffer memory in the primary control unit, the backup control unit completes the operation of writing to the peripheral device by retrieving the blocks of data to be written to the peripheral device from the backup memory device using the block number information.

5 Claims, 3 Drawing Sheets

BUFFERED PERIPHERAL SYSTEM AND METHOD FOR BACKING UP AND RETRIEVING DATA TO AND FROM BACKUP MEMORY DEVICE

This is a continuation of application Ser. No. 07/216,604, filed Jul. 8, 1988 now abandoned.

BACKGROUND OF THE INVENTION

The present invention relates to a buffered peripheral system capable performing a reliable backup operation, and more particularly to a buffered peripheral system, in which important data such as journal can be written in peripheral devices even when a fault is generated in a buffer memory, to allow the system to have a wide range of application.

In a conventional buffered peripheral system, as is evident from, for example, the explanation in the U.S. Pat. No. 4,423,480 with respect to FIG. 2 thereof, after data from a channel has been written in a buffer memory included in a control unit, the control unit writes the data in a plurality of peripheral devices.

In the above peripheral system, however, when an anomaly such as the disconnection of power source is generated in the control unit, there arises a problem that data in the buffer memory is lost or mismatched. In this case, it is required to repeat desired processing from the beginning thereof. Usually, it is possible to obtain journal once more. In a case where the journal cannot be obtained, data indicative of the journal is lost forever. Since the journal is indispensable for the recovery of a fault in a computer system and for a service using the journal, the vanishment of the journal will result in fatal damage.

SUMMARY OF THE INVENTION

An object of the present invention is to provide a buffered peripheral system with a backup operation, in which even when data stored in a buffer memory is lost or mismatched, the data is left unchanged to improve the reliability of the system and to make the repetition of processing unnecessary.

In order to attain the above object, according to the present invention, the contents of a buffer memory, which is copied from a backup memory, included in a buffered peripheral system is left in the backup memory, and data which has been fetched from the buffer memory into a peripheral device, is deleted from the backup memory.

Thus, according to the present invention, the contents of a buffer memory can be stored in a backup memory having the minimum of required storage capacity, and can be read out of the backup memory immediately after the contents of the buffer memory are lost.

DESCRIPTION OF THE PREFERRED EMBODIMENT

Figure 1:
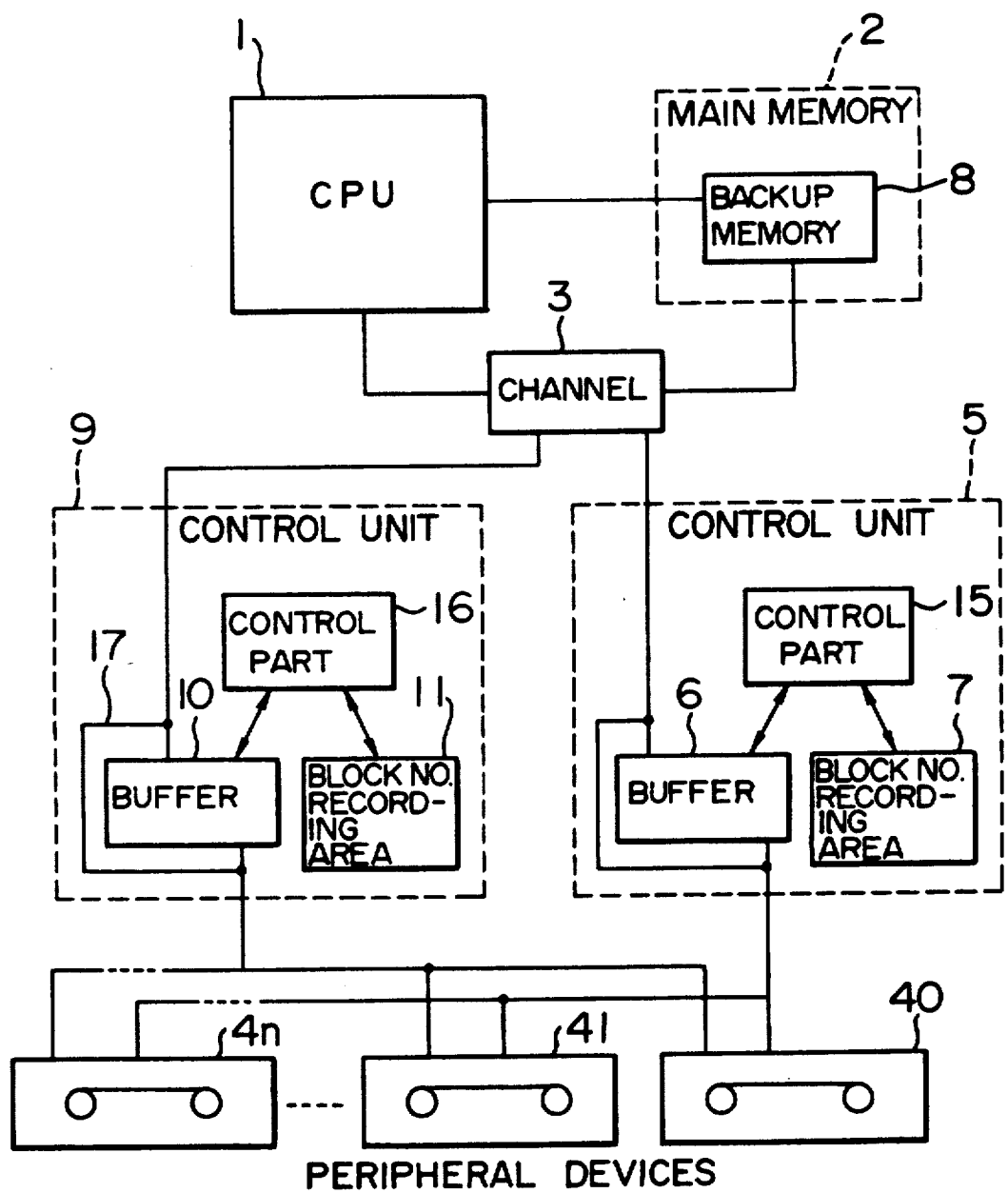
FIG. 1 is a block diagram showing an embodiment of a buffered peripheral system with a backup operation according to the present invention.

Now, explanation will be made of an embodiment of a buffered peripheral system with a backup operation according to the present invention, with reference to FIG. 1. FIG. 1, shows a central processing unit (CPU), a main memory 2, a channel 3 for sending data in the main memory 2 to peripheral devices 40, 41, —, and 4n through a control unit in accordance with a command from the CPU 1, and control units 5 and 9 each made up of a buffer memory 6, 10, a block-number recording area 7, 11 and a control part 15, 16 for interpreting a command from the channel 3, to issue an operating instruction to a peripheral device and to inform the channel 3, the state of the control unit. Data to be written in a peripheral device and data read out therefrom are temporarily stored in one of the buffer memories 6 and 10. Incidentally, the logical unit of data transferred between the CPU 1 and the peripheral devices is generally called "block". The block-number recording areas 7 and 11 store the number of the newest one of blocks which have been written in a peripheral device. The control part 15 controls the buffer memory 6 and the block-number recording area 7, and the control part 16 controls the buffer memory 10 and the block-number recording area 11. The main memory 2 includes a backup memory 8 for backing up the contents of the buffer memories 6 and 10. However, it is not always required that the backup memory 8 is included in the main memory 2, but the backup memory 8 may be included in, for example, the control unit 5 or 9. It is to be noted that in the present embodiment, the control unit 9 is a relief unit which is used when a fault is generated in the control unit 5.

Next, the operation of the present embodiment will be described. At first, explanation will be made of processing which is carried out by the CPU 1 when the embodiment operates normally, with reference to FIG. 2. The CPU 1 writes a desired block which is to be written in a peripheral device 40, into the backup memory 8 (step 21). Next, the CPU 1 instructs the channel 3 to output the desired block (step 22). Thus, the contents of the desired block stored in the backup memory 8 are written in the buffer memory 6 included in the control unit 5. The CPU 1 repeats the above operation till a predetermined time has elapsed (step 23). When a predetermined condition is satisfied, the control part 15 included in the control unit 5, writes the contents of the buffer memory 6 in the peripheral device 40, and records the number K(i) of the newest one of blocks which have been written in the peripheral device 40, in the block-number recording area 7. Then, the CPU 1 issues a command for reading out the contents K(i) of the block-number recording area 7 (step 24). Next, the CPU 1 issues a command for deleting the K(i)-th and preceding blocks in the backup memory 8, to make room for the backup memory 8 (step 25). Then, the next block group is processed in the above-mentioned manner.

Figure 3:
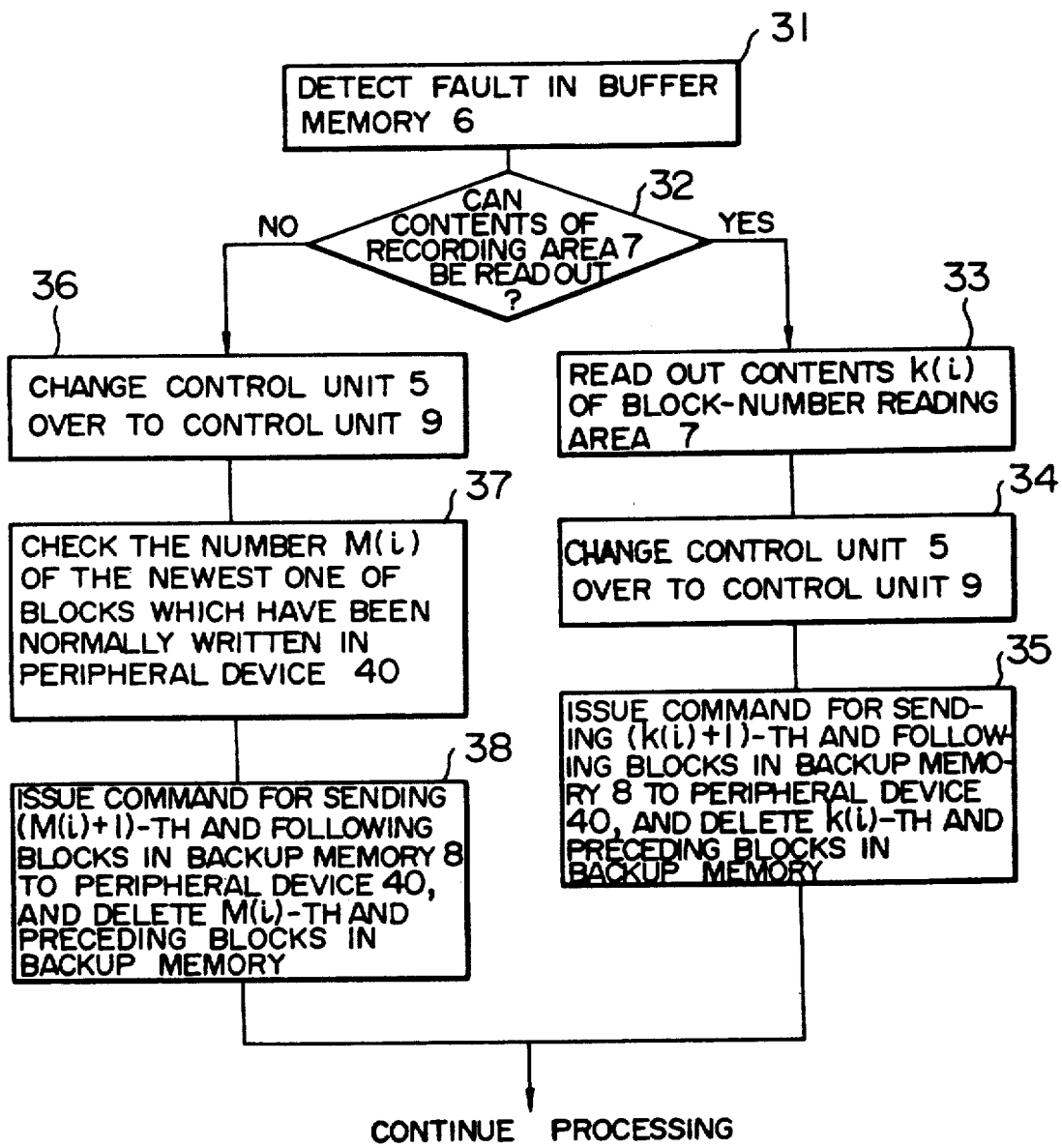
FIG. 3 is a flow chart showing the processing carried out by a central processing unit when a fault is generated in a buffer memory.

Next, explanation will be made of processing which is carried out by the CPU 1 when an anomaly is generated in the contents of the buffer memory 6, with reference to FIG. 3. The CPU 1 detects a fault in the buffer memory 6 (step 31). Then, it is checked whether or not the contents of the block-number recording area 7 can be read out (step 32). The contents K(i) of the area 7 are read out, if possible (step 33). Then, the CPU 1 changes the control unit 5 over to the relief control unit 9 (step 34). Then, the CPU 1 issues a command for sending the (K(i)+1)-th and following blocks which are stored in the backup memory 8, to the peripheral device 40 via the relief control unit 9, and deletes the K(i)-th and preceding blocks in the backup memory 8, to make room for the backup memory 8 (step 35). In a case where the contents of the block-number recording area 7 cannot be read out, the CPU 1 first changes the control unit 5 over to the relief control unit 9 (step 35), and checks the number M(i) of the newest one of blocks which have been normally written in the peripheral device 40, through a bypass 17 in the control unit 9 (step 37). Then, the CPU 1 issues a command for sending the (M(i)+1)-th and following blocks which are stored in the backup memory 8, to the peripheral device 40, and deletes the M(i)-th and preceding blocks in the backup memory 8, to make room for the backup memory 8 (step 38).

Figure 2:
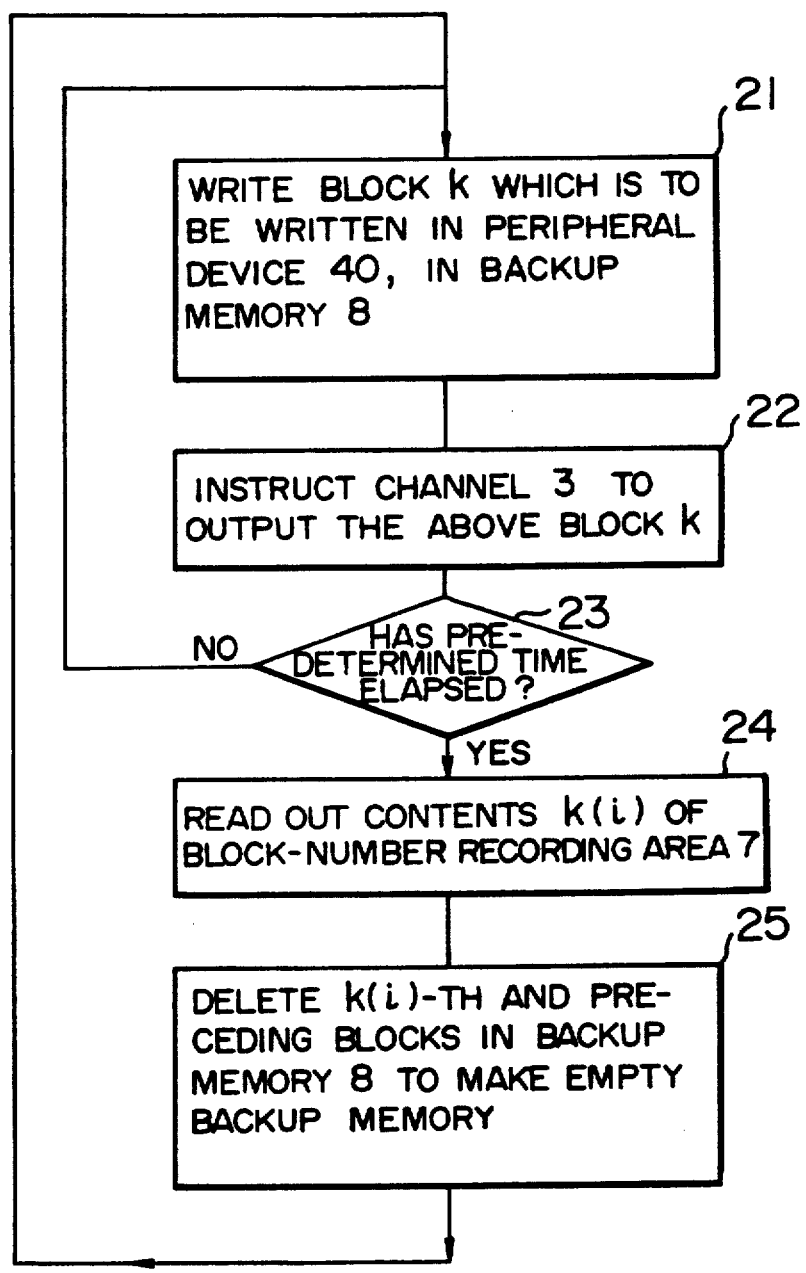
FIG. 2 is a flow chart showing the processing carried out by a central processing unit when the embodiment of FIG. 1 operates normally.

As is apparent from FIG. 2, in the present embodiment, the CPU 1 checks the contents of the block-number recording area 7 periodically. Alternatively, the following method may be used. That is, the CPU 1 periodically informs the control unit 5 of the number N(i) of a desired one of blocks stored in the backup memory 8. When the contents of the block-number recording area 7 agree with the number N(i), the CPU 1 is informed of that effect. In this case, also, the N(i)-th and preceding blocks in the backup memory 8 are deleted immediately after the above information is received by the CPU 1.

As has been explained in the foregoing, in a buffered peripheral system according to the present invention, even when data stored in a buffer memory is lost or mismatched, the data can be used. Accordingly, damage due to the vanishment of data is prevented, and moreover the repetition of processing is made unnecessary. Thus, the buffered peripheral system is high in reliability, and can reduce a cost necessary for the recovery of a fault in the system.

We claim:

1. A buffered peripheral system which is connected to a central processing unit through a channelling means, comprising:
   a peripheral device;
   a backup memory means for storing blocks of data written by said central processing unit, which are to be written to said peripheral device in accordance with a command from said central processing unit;
   a control unit, connected between said channelling means and said peripheral device, said control unit further comprising a buffer memory means for temporarily storing the block of data which is to be written to said peripheral device a recording means for recording a block number corresponding to a most recently written block of data in said peripheral device from said buffer memory means, and said control unit comprising a control means for issuing a command necessary to write said block of data stored in the buffer memory means to said peripheral device, including the block number associated with the block of data stored in said buffer memory means; and
   means for deleting the block of said which has been previously written to said peripheral device from said backup memory means.

2. A buffered peripheral system according to claim 1, wherein said central processing unit comprises a main memory means and said backup memory means is included in said main memory means.

3. A buffered peripheral system according to claim 1, wherein said central processing unit reads the block number recorded in said recording means at predetermined time intervals and deletes the blocks of data stored in said backup memory means whose block number is less than the block number recorded in said recording means to make room for subsequent blocks of data to be written to said peripheral device.

4. A buffered peripheral system according to claim 1, wherein said central processing unit sends, at predetermined time intervals, an information indicative of the block number of a desired one of blocks stored in said backup member means to said control unit said control unit compares the desired block number with the block number stored in said recording means and sends a signal to said central processing unit indicative of whether the block number recorded in said recording means is greater than or equal to the desired block number stored in backup memory means, and only if said block number recorded in said recording means is greater than or equal to, said central processing unit deletes the blocks of data corresponding to the block numbers that are less than the desired block number from the backup memory means.

5. A method of backing up a buffered peripheral system which is connected to a central processing unit, wherein said buffered peripheral system includes primary and back-up control units and a backup memory means to store blocks of data to be written to a peripheral device, said primary and back-up control units having a buffer memory means for temporarily storing a block of data, each of said first and second control units comprising a control means for issuing a command necessary to write the block of data stored in said buffer memory means to said peripheral device, including a block number associated with the block of data stored in said buffer memory means and a recording area for recording the block number corresponding to a most recently written block of data to said peripheral device from said buffer memory means, said buffer memory means being used for storing a copy of the contents of said backup memory means, said method comprising the steps of:
   (a) detecting a fault in said buffer memory in said primary control unit;
   (b) determining whether the content of said recording means can be read out from said buffer memory in said primary control unit; and
   (c) carrying out one of first and second processings, the first processing being carried out when the contents of said recording means can be read out, said first processing including the sub-steps of:
      (i) reading out the block number corresponding to a most recently written block of data to said peripheral device;
      (ii) changing said primary control unit that is in fault over to said back-up control unit;
      (iii) writing blocks of data which are stored in said backup memory means and which correspond to subsequent block numbers following the block number recorded in said recording means, to said peripheral device through said back-up control unit; and (iv) deleting the blocks of data corresponding to the block number recorded in said recording means and block numbers preceding said block number recorded in said recording means, from said backup memory means;

(d) said second processing being carried out when the content of said recording means cannot be read out, said second processing including the sub-steps of:

(i) changing said primary control unit that is in fault over to said back-up control unit;

(ii) determining the block number which corresponds to a most recently written block of data to said peripheral device;

(iii) writing the blocks of data which are stored in said backup memory means and which correspond to subsequent block numbers following the block number recorded in said recording means, to said peripheral device through said back-up control unit; and (iv) deleting the blocks of data corresponding to the block number recorded in said recording means and block numbers preceding said block number recorded in said recording means, from said backup memory means.

* * * * *